Oct. 25, 1949.  P. ROTHWELL  2,486,327
METHOD AND MEANS FOR PRODUCING DENTAL BRIDGEWORK
Filed Oct. 4, 1946
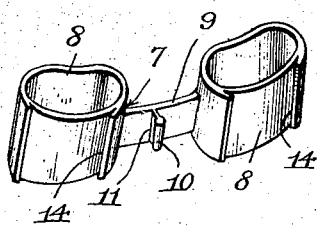
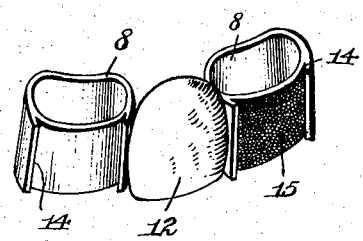
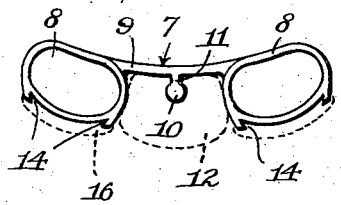
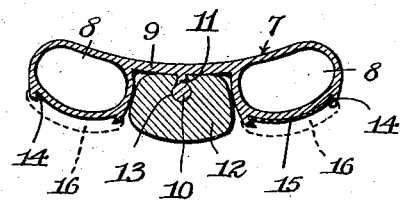
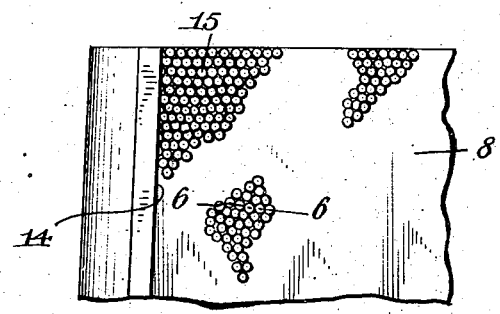
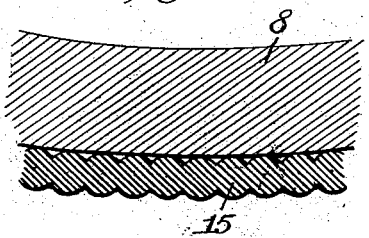
Peter Rothwell,
Inventor
By
Attorney.

Patented Oct. 25, 1949

2,486,327

UNITED STATES PATENT OFFICE 2,486,327

METHOD AND MEANS FOR PRODUCING DENTAL BRIDGEWORK

Peter Rothwell, Kenmore, N. Y.

Application October 4, 1946, Serial No. 701,214

6 Claims. (Cl. 32—12)

This invention relates to method and means for producing dental bridges and similar work, such as acrylic jackets and veneer crowns.

In dental bridge-work, particularly such as designed to include a false tooth adapted to replace an incisor which, by reason of its location in the mouth is easily seen, matching of the false crown teeth with adjacent natural teeth is quite difficult and invariably the intermediate tooth or teeth, as the case may be, of the bridge structure, usually porcelain and having the life-like translucence of natural teeth, are well matched with the latter. Difficulty, however, is always encountered in matching the anchoring built-up crown teeth to the intermediate false tooth or teeth of the bridge structure or denture and the natural teeth adjacent the latter; this being particularly true in attempting to create for the built-up teeth the life-like translucence of the porcelain false tooth or teeth and the natural teeth at opposite sides of the bridge structure or denture.

It is, of course, understood that in bridge-work, a bridge-frame is required having cup-like or crown terminals and a span or bridge-member serving as a backing for the porcelain tooth and connecting the cup-like or crown terminals together, also a false porcelain tooth or teeth which are attached to the span or bridge-member to occupy the space of the natural tooth or teeth being replaced. The cup-like or crown terminals are applied over the adjacent natural teeth, which are reduced in size to receive the same, and the terminals are cemented to the last-mentioned teeth so that the bridge is firmly secured in place. The span or bridge-member receives the false porcelain teeth which will have been matched to the natural teeth of the jaw and will have the translucence of the natural teeth being matched, while the front outer faces of the cup-like or crown terminals are invariably covered with a coating of liquid opacifier to hide the gold surface of the crown, which coating, as its name implies, is opaque, after which said coated surfaces are covered with a translucent substance truly matching in shade or color the false porcelain tooth and the natural teeth and built up and shaped to conform to the contour of said false and natural teeth. The teeth so built up to form are polished and are presumed to match the remaining teeth of the jaw to which the bridge structure is applied. While I have referred to bridge-work for incisors, it is to be understood that the same means and method is used when replacing molars, bicuspids or canine teeth.

Under the method now used and just described in a general way, a translucent thin facing is formed over an opaque light-reflecting veneer applied to the outer, usually gold, surfaces of the crowns of the bridge structure to prevent light rays striking the gold crowns. The light rays penetrate such translucent facings, prepared to match the false intermediate porcelain tooth or teeth of the bridge structure and the adjacent natural teeth, pass through such facings and are reflected back without the life-like appearance or translucence of the teeth being matched.

The opaque veneer material applied to the crowns is marketed in various colors or shades and it is liquid in form and usually referred to as an opacifier. It is invariably applied or painted onto the surfaces of the crowns with a brush and in most instances is white in color. However, some technicians use shades or colors under the impression that a more perfect match of the translucent facings can be obtained, but since all veneers are reflected back in dullness and never exactly match the false tooth or teeth and the natural teeth at the opposite sides of the bridge structure, the color or shade selected for the veneer may assist only partially in approaching the match desired and always without the life-like appearance or translucence so desirable.

It is the object of my invention to substitute for the opacifier now used to veneer or hide the gold forwardly-facing surfaces of the crowns a thin substantially light-absorbing coating or film which covers said surfaces to prevent the gold color of the crowns from being reflected back through the translucent facing material and thus impart to such facing material a color different than intended for it, but rather to give it the same life-like appearance or translucence which both the porcelain false intermediate tooth or teeth and the natural teeth at opposite ends of the bridge structure possess, thus assuring a proper match in color or shade with said false and natural teeth.

The particular means and method I use to accomplish this among others that may be available under my method will be hereinafter described.

In the drawings:

Fig. 1 is a perspective view of a bridge-frame, preferably constructed of gold and arranged to receive a single false porcelain tooth and adjacent tooth facings forming the front or outer portions of the crown teeth.

Fig. 2 is a top plan view of the bridge-frame.

Fig. 3 is a view similar to Fig. 1, having the false porcelain tooth attached to the span or bridge-member of the bridge-frame, and one of the crowns veneered.

Fig. 4 is a longitudinal section through the partly completed bridge structure shown in Fig. 3.

Fig. 5 is a front elevation of a portion of a crown on an enlarged scale, showing the light-absorbing veneer in the form it is applied to the front face of the crown.

Fig. 6 is a horizontal section on a still further enlarged scale, taken on line 6—6, Fig. 5, showing the globular granules constituting the veneer material set and ready to have the facing material applied thereto.

While, in the drawing forming part of this application, I have illustrated a bridge structure comprising two spaced-apart crowns, a backing in the form of a span or bridge-member connecting said crowns, a porcelain or other false tooth applied to said span or bridge-member and crown facings to represent additional teeth matching in color and translucence the false intermediate tooth and the adjacent natural teeth, it is to be understood that the crowns in many instances are spaced farther apart and connected by a span or bridge-member of greater length than that shown so that two or more false teeth may be attached to the span or bridge-member in the manner shown for the single false tooth.

The means employed for producing bridge-work in accordance with my invention includes the use of the usual bridge-frame considered as a whole and designated by the numeral 7 in the accompanying drawing. This bridge-frame is now commonly employed in producing bridge-work and it invariably comprises two spaced-apart cup-like members or hollow crowns 8 cast from gold and connected by a span or bridge-member 9 whose width is considerably less than the height of the crowns 8 and whose length determines the number of teeth to be employed between the crowns.

In the particular case illustrated in the drawing, the space between the crowns, or in other words the length of the span or bridge-member, approximately equals the exterior cross-sectional measurement of each of the crowns and this span or bridge-member has means for attachment thereto of a false porcelain tooth which is to occupy the space between the said crowns forward of the span or bridge-member. For a quick and ready attachment of the false procelain tooth to the span or bridge-member, the latter is provided with a vertically-disposed post 10 arranged midway between the crowns and connected to the front surface of the span or bridge member by a web 11.

The false porcelain tooth is designated by the numeral 12 and on its inner surface it is grooved, as at 13, the groove being of substantially key-formation to conform to the cross-sectional formation of the post 10 and its web 11. This groove is formed vertically in the rear face of the false porcelain tooth and its inner portion is, therefore, circular while its outer portion is narrow and made parallel-sided to conform to the dimensions of the web 11. The false tooth is, therefore, keyed to the span or bridge-member by sliding it over the post 10 and its connected web and when so doing, cement which is applied to its inner surface and in the groove 13 of the false tooth securely fastens the tooth to the bridge-frame.

It is, of course, understood that this false tooth is selected to match in size the tooth it is to replace and to match in shade or color the natural teeth with which the bridge structure is to be associated, which as now practiced assures a perfect match.

The attachment of the cup-like members or crowns 8 to the adjoining natural teeth differs in no manner from the present day method used; it being, of course, understood that the two adjoining natural teeth are reduced in size sufficient to receive these cup-like members or crowns and so that the front surfaces of the latter are in a receding position with respect to adjoining teeth. When the false or artificial crown-teeth facings, formed of plastic acrylic, are applied to the front surfaces of the crowns, these facings will be in the proper arcuate relation to the exposed natural teeth and the porcelain or other artificial tooth attached to the bridge-frame between the crowns thereof. The front surfaces of the crowns are somewhat undercut, as shown at 14, which undercuts are designed to firmly fasten the usual facings applied to the crowns in place, and they are also formed with numerous small irregularities, such as minute indentations, projections, hooks, undercuts, etc. which were formed in the wax pattern according to which the crown is cast. The use of such irregularities are found essential to assure proper adherence or bondage of the plastic crown teeth facings.

The application of the facing material to the front of each of the crowns is, under present day methods, effected after coating the outer faces of the crowns with an opaque liquid or opacifier, which when dry conceals the gold surface of the crown. After applying the plastic facing material or acrylic to the crowns and forming and compressing such material to a shape to match the contour of the false tooth 12 and the exposed natural teeth at opposite sides of the bridge structure, the light passing through the facing material strikes the opaque coating first applied to the crown and is reflected back through the facing in a dead whitecolor, resulting in the production of two artificial teeth at opposite sides of the porcelain tooth and between the natural teeth, which in no manner matches such teeth. Although it is common to use opaque liquid in various colors or shades, the plastic substance applied to the faces of the crowns is prepared by using colored acrylic to accurately match the false tooth 12 and the natural teeth; nevertheless, the dull white or other opaque coating applied directly to the crowns is reflected back under distortion and without life or brilliance and consequently a true match to the remaining teeth of the jaw is practically impossible.

In my invention I proceed to complete the bridge structure after applying the false tooth 12 to the bridge-frame in a different manner than now practiced, which results in a perfect match of the crown teeth with the false tooth 12 and the natural teeth and with the same life and translucence which the two last-mentioned types of teeth possess. Accordingly after having secured the false tooth 12 to the bridge-frame in the manner described and as now practiced, I apply a thin veneer or film 15 of a light-absorbing substance to the outer or front surfaces of the crowns, which substance I render slightly opaque and proceed in the following manner, viz, by mixing an acrylic powder—a polymer—with an acrylic liquid—a monomer—and a small quantity of opacifier in the following proportions, viz: ten one-thousandths of an ounce of pure white acrylic in dry form, about eight one-thousandths of an ounce of acrylic liquid, and one one-thousandths of an ounce of opacifier, or approximately such proportions.

The pure white dry acrylic may be described as being in the form of minute globular granules and the mentioned ingredients are mixed at a temperature below 70° F. and when mixed are of a consistency to flow readily over the gold surfaces of the crowns, which should be at substantially the same temperature at which the ingredients are mixed. The proportion of ingredients mentioned will suffice for a single bridge structure or denture. The required quantity of dry acrylic or polymer is placed within a suitable mixing dish and the liquid acrylic or monomer poured over the same so as to saturate the dry globular granules of the dry acrylic and while mixing the same a drop of opacifier, which is about in the proportion above mentioned, will be added. Immediately after mixing the three ingredients the fluid mixture is spread over the faces of the crowns of the bridge structure and the use of a magnifying glass is preferably resorted to in order to spread the saturated globular granules evenly, all being effected under the cool condition above mentioned, it being the purpose of my invention to avoid coalescense of the globular granules, which would result in a homogeneous stratum or layer covering the faces of the crowns. While the saturated granules lie in contact with each other when first applied to the faces of the crowns, because of their globular conformation infinitesimal interstices will be seen between the granules under a magnifying glass, but gradually these granules swell and join each other over larger areas of the granules, as shown in Fig. 6, thereby reducing the number of intervening interstices or entirely eliminating them. The liquid acrylic or monomer gradually becomes evaporated and the layer of the mixture so applied becomes almost dry and assumes a honey-comb or lace-work appearance. The gold surfaces of the crowns can be faintly seen under a magnifying glass through occasional infinitesimal interstices in the veneer layer and the usual facing material, designated by the numeral 16, is then applied thereover in the same manner as facing materials are being applied over the opaque veneer painted on the faces of the crowns under present day methods. The thicknesses of the veneer layer and facing material shown in the drawing are illustrative only and in actual practice may vary therefrom.

Crown teeth facings as now produced and applied to the usual opaque veneer reflect the light passing therethrough from the opaque veneering, whereas in this invention the light rays passing through the facing material are absorbed by the slightly opaque mat or veneer and cause said rays to be dissipated. Any interstices in the veneer or mat that may remain would enable only faint rays of light to be reflected back, but such faint reflected rays would have no effect on the facing material. It will, therefore, be understood that this light-absorbing veneer or mat can only be produced when mixing the three ingredients forming the same at a comparatively cool or low temperature; for example, a temperature under 70° F. so as to prevent complete coalescence of the globular granules. The crowns should be at approximately such temperature and the application of the mixture to the outer faces of the crowns should be at the mentioned low temperature.

It is important that the application of the mixture to the crowns must be effected under such conditions or temperature immediately after saturating the globular granules or polymer and mixing the opacifier therewith, since delay in so applying the mixture would result in the ingredients being converted into an opaque mass, which will then have lost the very qualities required to assure a slightly opaque yet light-absorbing veneer or mat when applied to the gold surfaces of the crowns. It has been found that at a temperature of about 70° F. and above, the globular granules of the polymer coalesce or jell quickly and even with the small quantity of opacifier mentioned, would form a completely opaque light-reflecting surface after evaporation of the monomer.

After the facing material is applied to the light-absorbing veneer or mat, it is shaped to rudimentary form approximating the contour of the intervening false tooth and after placing the denture or bridge structure in the flask originally prepared for use of the same, the facing material is condensed and thereby given its finished shape or contour, ready to be polished. Subjecting the facings to heat and other steps in the operation to produce the finished crown facings are similar to those now practiced.

While subjecting the facing material to pressure within the flask so as to condense said material, steps common to both present day methods and to my method, pressure is exerted on the slightly opaque veneer or mat underneath and the swollen or expanded globular granules become somewhat condensed and the slight interstices in the veneer or mat are almost entirely eliminated, if not completely eliminated. Light passing through the facings of the crown teeth so provided are, therefore, not reflected back, as occurs when covering the gold surfaces of the crowns with an opaque veneer, as now practiced, and facings or crowns built up of material which will exactly match in color and translucence the false tooth or teeth between the crown teeth and the adjacent natural teeth are assured.

Attempts have been made to shade or color the opaque material applied to the gold surfaces of the crowns, but even under such conditions the reflected light rays fail to truly reproduce the colors and at all times fail to give the facing material the life-like translucence which the false tooth or teeth and the natural teeth to be matched possess. As now practiced, the opaque veneer applied to the crowns proper covers the gold surfaces of the latter and prevents such surfaces from being reflected back through the facing material of the crown teeth, but in place of the gold surface being reflected back, the white or other colored opaque veneer is reflected back, giving the tooth a lifeless appearance and invariably a different shade than that which it is attempted to produce. The light rays passing through the facing material of the crown teeth reflects back the color of the opaque background and thereby destroys the natural color of the translucent facing material or, in other words, produces a distortion of the true color or shade of the facing material.

According to my invention, the mixing of an opacifier with a pure white acrylic or polymer and a similar monomer to slightly opacify the polymer creates a partial opaque translucence for the mixture sufficient to obliterate the reflection of the underlying gold surface; the quantity of opacifier used is not enough, however, to prevent the absorption of light rays so as to produce what I term a three dimensional color effect approaching life-like qualities and disclosing the full intensity of the color of the facing material applied to the crown teeth.

Having thus described my invention, what I claim is:

1. A denture in the form of a dental bridge, comprising a bridge-frame having crowns at opposite ends and a bridge-member connecting said crowns together, a false tooth applied to said bridge-member between said crowns, a light-absorbing veneer covering the front surface of each of said crowns and formed of moistened white acrylic and an opacifier with the globular granules of the acrylic disposed in a substantially single layer and with the opacifier rendering said granules slightly opaque to prevent light-rays passing therethrough and striking the surface of the crown underneath said veneer, and facings built up on the veneered surface of each of said crowns through which the light-rays pass to be absorbed in the slightly opacified veneer.

2. A denture in the form of a dental bridge having a frame provided with crowns at opposite ends, a veneer facing the front surface of each of said crowns comprising a polymer formed of dry minute translucent granules, a liquid monomer to saturate said polymer and a substance resisting the passage of light-rays through said granules and causing said light-rays to be absorbed by said granules.

3. A denture in the form of a dental bridge having a frame provided with crowns at opposite ends, a veneer facing the front surface of each of said crowns comprising a polymer formed of white minute particles, a monomer to saturate said particles and an opacifier to enter and cover said polymer, said opacifier being of a nature to resist the passage of light-rays through said polymer and cause said light-rays to be absorbed by the latter.

4. The method of constructing dentures in the form of dental-bridge work, comprising the application to the outer surface of each of the crowns of the bridge-frame of a veneer including by weight approximately 10 parts of an acrylic in fine granular form, mixing said acrylic with about 8 parts by weight of a liquid to be absorbed by the granules of said acrylic at a temperature to prevent coalescence of said granules and at the same temperature adding about 1 part by weight of an opacifier to render said granules slightly opaque so as to restrict the passage of light-rays through said veneer and cause said light-rays to be absorbed thereby, and in facing the so veneered surface with a facing material.

5. The method of constructing dentures in the form of dental-bridge work, comprising the application to the outer surface of each of the crowns of the bridge-frame of a veneer including an acrylic in fine granular form, mixing said acrylic at a temperature below 70° F. with a liquid to saturate the granules of said acrylic and at such temperature adding an opacifier, stirring the latter with the two first-mentioned ingredients, applying the mixture so formed as a veneer to the surface of each of said crowns and allowing the veneer to dry at a like temperature to prevent coalescing of said granules, and in applying the usual facing material to said veneered crowns, said opacifier serving to prevent reflection of the light-rays from the surfaces of said facing material.

6. The method of constructing a denture in the form of a dental bridge, comprising the utilization of a gold bridge-frame having crowns at opposite ends, applying a false tooth or teeth to said bridge-frame between said crowns, covering the face of each of said crowns with a veneer consisting of a polymer composed of pure white minute granules, mixing said polymer with a monomer to saturate said granules at a temperature less than 70° F. so as to prevent coalescence of said granules, stirring the so saturated granules at such temperature and adding thereto an opacifier while continuing to stir said mixture, applying a veneer of said mixture to the front surface of each of said crowns at such temperature in a manner to dispose said granules in contiguity and in substantially a single layer, allowing said monomer to evaporate from said polymer at a temperature which will prevent coalescence of the granules of said polymer, then applying a plastic substance to the veneered surfaces of said crowns to serve as a facing for said crowns and shaping said substance into rudimentarily formed teeth somewhat conforming to the contour of said false tooth and the natural teeth of the jaw to which said denture is to be applied, compressing said rudimentarily-formed plastic teeth to the finished contour while subjecting the same to heat at a temperature above 70° F., and finally polishing the so processed teeth to conform in appearance to said false tooth and said natural teeth.

PETER ROTHWELL.

REFERENCES CITED

The following references are of record in the file of this patent:

UNITED STATES PATENTS

| Number | Name | Date |
| --- | --- | --- |
| 1,465,473 | Hansen | Aug. 31, 1923 |
| 2,120,006 | Strain | June 7, 1938 |
| 2,230,164 | Myerson | Jan. 28, 1941 |
| 2,279,067 | Shapiro | Apr. 7, 1942 |